United States Patent
Iizuka et al.

(10) Patent No.: US 12,270,924 B2
(45) Date of Patent: Apr. 8, 2025

(54) ESTIMATION DEVICE, ESTIMATION METHOD, AND RECORDING MEDIUM

(71) Applicant: Panasonic Intellectual Property Management Co., Ltd., Osaka (JP)

(72) Inventors: Shoichi Iizuka, Osaka (JP); Takeshi Nakayama, Hyogo (JP); Naoki Honma, Iwate (JP); Nobuyuki Shiraki, Iwate (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 433 days.

(21) Appl. No.: 17/609,288

(22) PCT Filed: Feb. 17, 2021

(86) PCT No.: PCT/JP2021/005890
§ 371 (c)(1),
(2) Date: Nov. 5, 2021

(87) PCT Pub. No.: WO2021/172126
PCT Pub. Date: Sep. 2, 2021

(65) Prior Publication Data
US 2022/0214421 A1    Jul. 7, 2022

(30) Foreign Application Priority Data

Feb. 27, 2020  (JP) .................................. 2020-031770

(51) Int. Cl.
*G01S 5/02* (2010.01)
(52) U.S. Cl.
CPC ...................................... *G01S 5/02* (2013.01)
(58) Field of Classification Search
CPC ....................................................... G01S 5/02
See application file for complete search history.

(56) References Cited

U.S. PATENT DOCUMENTS

| 5,210,772 A | * | 5/1993 | Nakagawa | ............... G08G 1/01 380/34 |
| 9,672,463 B2 | * | 6/2017 | Jeon | ...................... G06M 11/00 |

(Continued)

FOREIGN PATENT DOCUMENTS

| CN | 110222829 | * | 9/2019 |
| EP | 3995850 A1 | | 5/2022 |

(Continued)

OTHER PUBLICATIONS

Extended European Search Report dated May 31, 2023 issued in the corresponding European Patent Application No. 21761126.8.

(Continued)

*Primary Examiner* — Vladimir Magloire
*Assistant Examiner* — Noah Yi Min Zhu
(74) *Attorney, Agent, or Firm* — Rimon P.C.

(57) ABSTRACT

A sensor includes: a complex transfer function calculator that calculates a complex transfer function representing propagation characteristics between each N transmission antenna element and each M reception antenna element, using radio waves transmitted as a reception signal in a space where at least one living body is present from each N transmission antenna element and received by each M reception antenna element; a spectrum calculator that: calculates likelihood spectra, each indicating a likelihood of presence of each living body, by an estimation algorithm for estimating the presence from living body information that is a living body component in the complex transfer function, using different values as the number of the at least one living body; and calculates an integrated spectrum by integrating the likelihood spectra calculated; and an estimator that estimates living body information indicating at least the number of living bodies, and outputs the living body information estimated.

14 Claims, 7 Drawing Sheets

(56) References Cited

U.S. PATENT DOCUMENTS

| | | | |
|---|---|---|---|
| 10,048,350 B1* | 8/2018 | Piao | G01S 5/0284 |
| 10,051,414 B1* | 8/2018 | Omer | G01S 13/56 |
| 2016/0377713 A1* | 12/2016 | Kamo | G01S 7/35 |
| | | | 342/157 |
| 2018/0196131 A1* | 7/2018 | Iizuka | G01S 13/003 |
| 2021/0215788 A1* | 7/2021 | Hu | G01S 13/56 |
| 2022/0342039 A1* | 10/2022 | Eschbaumer | G01S 7/415 |

FOREIGN PATENT DOCUMENTS

| | | | |
|---|---|---|---|
| JP | 5025170 B2 | | 9/2012 |
| JP | 5047002 B2 | | 10/2012 |
| JP | 2014-228291 A | | 12/2014 |
| JP | 2015-117972 A | | 6/2015 |
| JP | 2015117972 | * | 6/2015 |
| WO | 2021/002049 A1 | | 1/2021 |

OTHER PUBLICATIONS

Miao Yang et al: "Measurement-Based Feasibility Exploration on Detecting and Localizing Multiple Humans Using MIMO Radio Channel Properties", IEEE Access, IEEE, USA, vol. 8, Dec. 27, 2019 (Dec. 27, 2019), pp. 3738-3750, XP011766214.

International Search Report and Written Opinion issued on Apr. 20, 2021 in International Patent Application No. PCT/JP2021/005890; with partial English translation.

* cited by examiner

ESTIMATION DEVICE, ESTIMATION METHOD, AND RECORDING MEDIUM

CROSS-REFERENCE OF RELATED APPLICATIONS

This application is the U.S. National Phase under 35 U.S.C. § 371 of International Patent Application No. PCT/JP2021/005890, filed on Feb. 17, 2021, which in turn claims the benefit of Japanese Application No. 2020-031770, filed on Feb. 27, 2020, the entire disclosures of which applications are incorporated by reference herein.

TECHNICAL FIELD

The present disclosure relates to an estimation device, an estimation method, and a recording medium.

BACKGROUND ART

A technology has been developed that uses wirelessly transmitted signals to detect a target object (for example, see Patent Literature (PTL) 1).

PTL 1 discloses the capability of analyzing the eigenvalues of Doppler shift components included in wirelessly received signals, using Fourier transform to know the number or positions of living bodies to be detected.

CITATION LIST

Patent Literature

[PTL 1] Japanese Unexamined Patent Application Publication No. 2015-117972
[PTL 2] Japanese Unexamined Patent Application Publication No. 2014-228291
[PTL 3] Japanese Patent No. 5047002
[PTL 4] Japanese Patent No. 5025170

SUMMARY OF INVENTION

Technical Problem

Some of the algorithms for detecting a target object require an entry of the number of target objects to be detected to the algorithms. When the number of target objects is unknown, a problem arises that a target object cannot be detected.

The present disclosure aims to provide an estimation device and so forth capable of estimating information on a living body even when the number of living bodies to be detected is unknown.

Solution to Problem

The estimation device according to the present disclosure is an estimation device that includes: a complex transfer function calculator that calculates a complex transfer function representing propagation characteristics between each of N transmission antenna elements and each of M reception antenna elements, using radio waves that are transmitted in a space as a reception signal from each of the N transmission antenna elements and received by each of the M reception antenna elements, where N and M are natural numbers greater than or equal to two, the space being a space in which at least one living body is present; a spectrum calculator that: (a) calculates likelihood spectra by use of an estimation algorithm for estimating presence of each of the at least one living body from living body information, using each of different values as a total number of the at least one living body, the likelihood spectra each indicating a likelihood of the presence, the living body information being a living body component included in the complex transfer function; and (b) calculates an integrated spectrum by integrating the likelihood spectra calculated; and an estimator that estimates, from the integrated spectrum, living body information indicating at least the total number of the at least one living body that is present in the space, and outputs the living body information estimated.

These general and specific aspects may be implemented using a system, a method, an integrated circuit, a computer program, or a computer-readable recording medium such as a CD-ROM, or any combination of systems, methods, integrated circuits, computer programs, or computer-readable recording media.

Advantageous Effects of Invention

The estimation device according to the present disclosure is capable of estimating information on a living body even when the number of living bodies to be detected is unknown.

Figure 1:
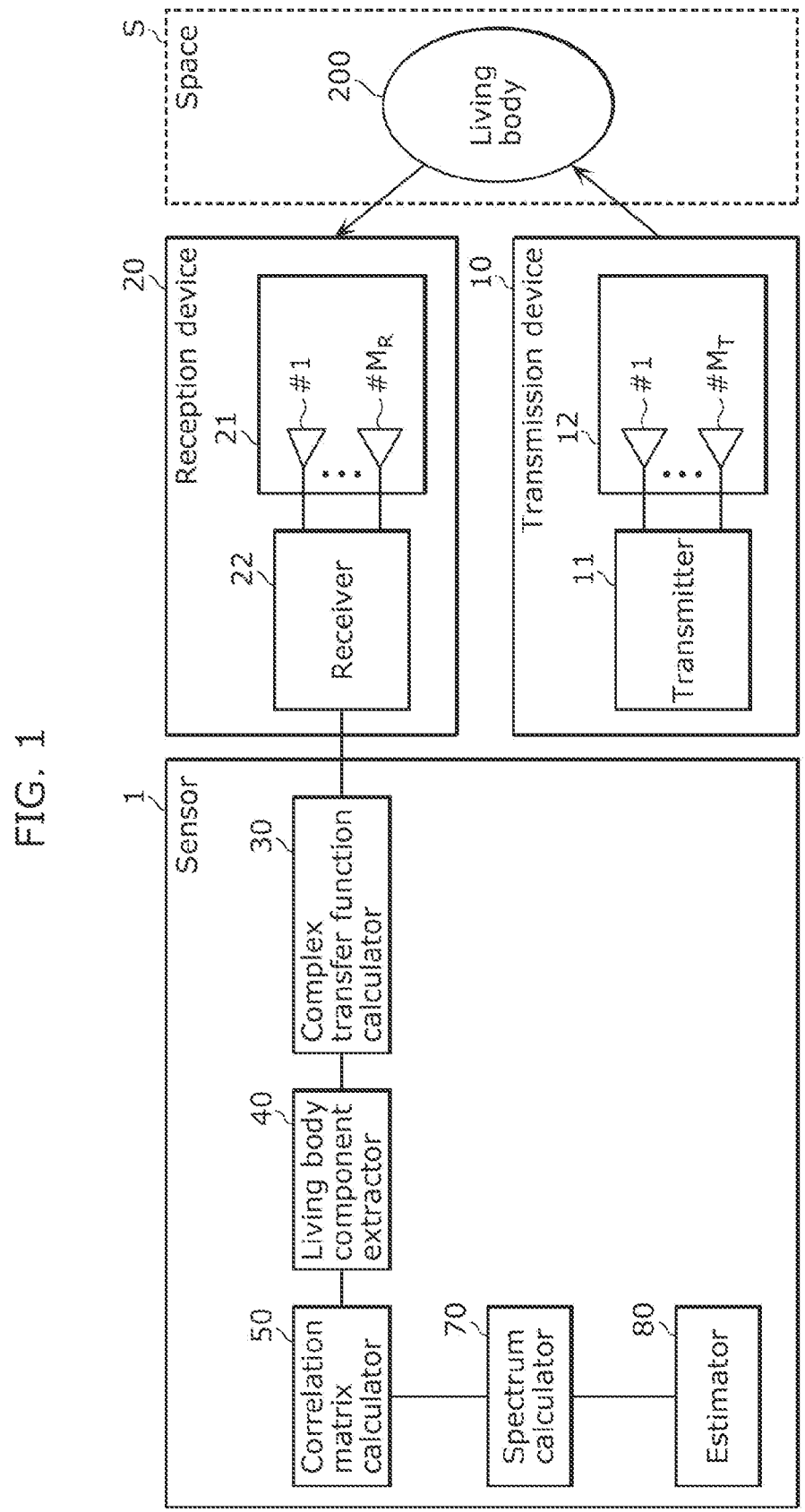
FIG. 1 is a block diagram showing the configuration of a sensor according to Embodiment 1.

DESCRIPTION OF EMBODIMENTS (Underlying Knowledge Forming Basis of the Present Disclosure)

In relation to the detection technologies disclosed in the Background section, the inventors have found the problems described below.

Technologies have been conventionally developed of detecting a target object using wirelessly transmitted signals (for example, see PTL 1 to PTL 4).

For example, PTL 1 discloses a technology of estimating the number or positions of persons to be detected by analyzing the eigenvalues of Doppler shift components, using Fourier transform. More specifically, the processing apparatus disclosed in PTL 1 performs Fourier transform on reception signals, determines an autocorrelation matrix of waveforms of specified frequency components extracted, and obtains eigenvalues by eigenvalue decomposition on such autocorrelation matrix. In general, an eigenvalue and an eigenvector each indicate a propagation channel, i.e., a single path, through which radio waves propagate from a transmission antenna to a reception antenna. However, the technology disclosed in PTL 1 removes components that do not include living body information. As such, only a path corresponding to a signal reflected by a living body, a path corresponding to the secondary reflection of such signal, and a path corresponding to noise occur as eigenvalues and eigenvectors. Here, the values of eigenvalues corresponding to noise are smaller than the values of eigenvalues corresponding to a living body. It is thus possible to estimate the number of living bodies by counting the number of ones of these eigenvalues that are larger than a predetermined threshold.

However, the technology disclosed in PTL 1 has the problem as described below. That is to say, when a living body to be detected is present in a relatively distant location from a detection device, or when a relatively large number of living bodies is present, a difference in the eigenvalues between the living bodies and noise becomes small. This results in a reduced accuracy of estimating the number of persons. This is because, when the Doppler effect is extremely weak, the estimation of the number of persons is affected by: internal noise of the reception device or interference waves from an object other than target objects to be detected; and the presence of an object, other than the target objects, that generates a Doppler shift. These effects make it hard to detect feeble signals having a Doppler shift. Also, the sizes of living bodies to be measured are relatively large and living body components are distributed, spanning a plurality of eigenvalues. As such, when a relatively large number of living bodies is present, the eigenvalues of the living bodies cannot be completely separated from one another, which makes it hard to estimate the number of persons.

PTL 2 discloses a technology of estimating the position of a target object, using a direction estimation algorithm such as MUltiple SIgnal Classification (MUSIC). More specifically, a receiving station that has received signals from a transmitting station performs Fourier transform on the received signals, determines an autocorrelation matrix of waveforms of specified frequency components extracted, and applies a direction estimation algorithm such as MUSIC method. This achieves direction estimation with high accuracy. However, MUSIC method used in PTL 2 requires an entry of the number of living bodies to be detected. The detection technology of PTL 2 thus requires a preliminary estimation of the number of persons.

For example, PTL 3 discloses a technology of estimating the number of incoming waves, i.e., the number of transmission devices such as mobile phones from a correlation between eigenvectors of reception signals received by a plurality of antennas and steering vectors in a range at which radio waves can arrive.

For example, PTL 4 discloses a technology of estimating the number of incoming waves by: using steering vectors to calculate evaluation functions for a various number of incoming waves given for reception signals received by a plurality of antennas; and estimating that the number of incoming waves with the maximum evaluation function is a true number of incoming waves.

However, the technologies disclosed in PLT 3 and PTL 4 are intended for estimating the number of transmission devices that emit radio waves, and thus cannot estimate the number of living bodies.

In view of the above, the present inventors have conceived an estimation device and so forth capable of estimating a larger number of living bodies with higher accuracy using wireless signals, without requiring target living bodies to have a special device such as a transmission device.

The estimation device according to an aspect of the present disclosure is an estimation device that includes: a complex transfer function calculator that calculates a complex transfer function representing propagation characteristics between each of N transmission antenna elements and each of M reception antenna elements, using radio waves that are transmitted in a space as a reception signal from each of the N transmission antenna elements and received by each of the M reception antenna elements, where N and M are natural numbers greater than or equal to two, the space being a space in which at least one living body is present; a spectrum calculator that: (a) calculates likelihood spectra by use of an estimation algorithm for estimating presence of each of the at least one living body from living body information, using each of different values as a total number of the at least one living body, the likelihood spectra each indicating a likelihood of the presence, the living body information being a living body component included in the complex transfer function; and (b) calculates an integrated spectrum by integrating the likelihood spectra calculated; and an estimator that estimates, from the integrated spectrum, living body information indicating at least the total number of the at least one living body that is present in the space, and outputs the living body information estimated.

The estimation device according to this aspect uses an integrated spectrum obtained by integrating a plurality of likelihood spectra that are calculated by use of each of different values as the number of living bodies to be detected, and outputs information on the living bodies that are present in the space. This configuration thus does not require an entry of the number of living bodies to be detected. The estimation device is thus capable of estimating information on the living bodies even when the number of living bodies to be detected is unknown.

For example, the estimator may estimate, from the integrated spectrum, the living body information further indicating a position of each of the at least one living body that is present in the space, and output the living body information estimated.

The estimation device according to this aspect is capable of estimating information indicating the positions of the living bodies as living body information, in addition to the number of living bodies. The estimation device is thus capable of estimating more information on the living bodies even when the number of living bodies to be detected is unknown.

For example, the spectrum calculator may calculate the likelihood spectra, using, as the different values, a plurality of natural numbers less than or equal to (N×M−1), a plurality of natural numbers less than or equal to N, or a plurality of natural numbers less than or equal to M.

The estimation device according to this aspect calculates a plurality of likelihood spectra, using at least one of the number of transmission antenna elements or the number of reception antenna elements. In the case of using living body information included in complex transfer functions, living body information is more accurately defined when an estimated number of living bodies is less than or equal to the value obtained by multiplying the number of transmission antenna elements by the number of reception antenna elements. Living body information is further more accurately defined when an estimated number of living bodies is less than or equal to the number of transmission antenna elements or the number of reception antenna elements. The estimation device is thus capable of estimating information on the living bodies with higher accuracy in an easier manner even when the number of living bodies to be detected is unknown.

For example, the spectrum calculator may calculate the likelihood spectra, using, as the different values, a plurality of natural numbers less than or equal to a value that is defined as a maximum number of living bodies that can be present in the space.

The estimation device according to this aspect calculates a plurality of likelihood spectra, using the value that is defined as the maximum number of living bodies that can be present in the space. In some cases, the maximum number of living bodies that can be present in the space is preliminarily defined in accordance with, for example, the size (area or capacity) of the space. In such a case, the number of living bodies less than or equal to such maximum number is assumed to be present in the space. In other words, there is no need to assume that the number living bodies that exceeds such maximum number is present in the space. As such, by calculating a plurality of likelihood spectra using a plurality of natural numbers less than or equal to the maximum number, it is possible to minimize computation to a necessary and sufficient amount, thus preventing computation from being performed for an unnecessarily large number of living bodies. The estimation device is thus capable of estimating information on the living bodies through a necessary and sufficient amount of computation even when the number of living bodies to be detected is unknown.

For example, the estimation device may further include: a storage that stores the living body information estimated by the estimator in the past. Here, the spectrum calculator may calculate the likelihood spectra, using, as the different values, a plurality of natural numbers in a range that includes a total number of living bodies indicated by the living body information stored in the storage.

The estimation device according to this aspect calculates a plurality of likelihood spectra, using the number of living bodies that were present in the space in the past. With this, it is possible to calculate a plurality of likelihood spectra in an easier manner for the space in which the number of living bodies that is equivalent to the number of living bodies that were present in the space in the past is assumed to be present. The estimation device is thus capable of estimating information on the living bodies in an easier manner even when the number of living bodies to be detected is unknown.

For example, the estimator may: obtain at least one local maximum value that is one of a plurality of local maximum values in the likelihood spectra and that takes a maximum value in a predetermined range that includes the at least one local maximum value; determine a first local maximum value that is one of the at least one local maximum value obtained and whose differential from a second local maximum value is largest, the second local maximum value being second largest after the first local maximum value; and estimate, as the total number of the at least one living body, a number indicating a place of the first local maximum value determined in descending order of the at least one local maximum value.

The estimation device according to this aspect uses a ratio approach to output the number of peaks derived from living bodies that is obtained by excluding peaks derived from virtual images from a plurality of peaks included in the likelihood spectra. The present inventors have found that, among the peaks included in the likelihood spectra, virtual image-derived peaks have characteristics that their peak values are relatively small or relatively gentle. On the basis of such knowledge, the inventors have arrived at the technology of excluding the virtual image-derived peaks from the peaks included in the likelihood spectra, using a ratio approach. The estimation device uses a plurality of peaks included in the likelihood spectra to perform processing. Stated differently, there is no need to set a threshold for likelihoods, thus preventing the processing from being affected by the magnitude of the threshold to be set. Also, since this configuration does not use a machine learning model, it is possible to save the time and trouble of preparing training data and preliminary learning processing. The estimation device is thus capable of estimating information on the living bodies in an easier manner even when the number of living bodies to be detected is unknown.

For example, the estimator may determine the first local maximum value, using, as the at least one local maximum value, only at least one third local maximum value that is one of the at least one local maximum value and whose differential from a value is greater than or equal to a threshold, the value being obtained by multiplying, by a predetermined ratio, a value included in a predetermined range that includes the at least one third local maximum value.

The estimation device according to this aspect is capable of excluding the virtual image-derived peaks from the peaks included in the likelihood spectra in a more appropriate manner. The virtual image-derived peaks in the likelihood spectra are relatively gentle, and thus are distinguishable in accordance with the magnitude of a differential between the local maximum value and the value obtained by multiplying a predetermined ratio by the value included in a predetermined range that includes such local maximum value. The estimation device is thus capable of estimating information on the living bodies in an easier manner by eliminating the effects caused by the virtual images even when the number of living bodies to be detected is unknown.

For example, the estimator may estimate, as the total number of the at least one living body, a total number of sections in which the likelihood in each of the likelihood spectra is greater than or equal to a threshold.

The estimation device according to this aspect is capable of outputting the number of living body-derived peaks that is obtained by excluding the virtual image-derived peaks from a plurality of peaks included in the likelihood spectra, using sections that are distinguished on the basis of the magnitude of the likelihood in the likelihood spectra with respect to the threshold. On the basis of such knowledge, the present inventors have arrived at the technology of excluding the virtual image-derived peaks from the peaks included in the likelihood spectra, using the foregoing method that uses the sections. Since the estimation device uses the method that uses the sections, that is, the estimation device does not need to perform difference comparison for a plurality of peaks. This thus simplifies the processing. Also, since this configuration does not use a machine learning model, it is possible to save the time and trouble of preparing training data and preliminary learning processing. The estimation device is thus capable of estimating information on the living bodies in an easier manner even when the number of living bodies to be detected is unknown.

For example, the estimator may estimate, as the total number of the at least one living body, a total number of living bodies that is outputted by inputting the integrated spectrum calculated by the spectrum calculator to a model that is preliminarily created by machine learning that uses, as training data, the total number of the at least one living body and an image representing each of the likelihood spectra that indicates the likelihood of the presence of each of the at least one living body in the space.

The estimation device according to this aspect uses a model preliminarily created by machine learning to output the number of living body-derived peaks that is obtained by excluding the virtual image-derived peaks. On the basis of the foregoing knowledge, the inventors have arrived at the technology of excluding the virtual image-derived peaks from the peaks included in the likelihood spectra, using a model created by machine learning. The estimation device uses the model created by machine learning, that is, the estimation device does not need to perform difference comparison for a plurality of peaks. This thus simplifies the processing. Stated differently, there is no need to set a threshold for likelihoods, thus preventing the processing from being affected by the magnitude of the threshold to be set. The estimation device is thus capable of estimating information on the living bodies in an easier manner even when the number of living bodies to be detected is unknown.

For example, the estimator may output the living body information, using, as the model, a convolutional neural network model.

The estimation device according to this aspect is capable of estimating information on the living bodies in a more appropriate manner, using a convolutional neural network even when the number of living bodies to be detected is unknown.

For example, the spectrum calculator may calculate the likelihood spectra, using, as the estimation algorithm, an estimation algorithm for estimating presence of each living body indicated by a total number of living bodies that are present in the space, when the total number of living bodies has been entered to the estimation algorithm.

The estimation device according to this aspect is capable of obtaining information on living bodies that are present in the space, using an estimation algorithm that works on the assumption that the number of living bodies that are present in the space is entered, without requiring an entry of the number of living bodies that are present in the space. The estimation device is thus capable of estimating information on the living bodies even when the number of living bodies to be detected is unknown.

For example, the spectrum calculator may calculate the likelihood spectra, using, as the estimation algorithm, MUltiple SIgnal Classification (MUSIC) method.

The estimation device according to this aspect is capable of estimating information on the living bodies, using MUSIC method, even when the number of living bodies to be detected is unknown.

Also, the estimation method according to an aspect of the present disclosure is an estimation method that includes: calculating a complex transfer function representing propagation characteristics between each of N transmission antenna elements and each of M reception antenna elements, by use of radio waves that are transmitted in a space as a reception signal from each of the N transmission antenna elements and received by each of the M reception antenna elements, where N and M are natural numbers greater than or equal to two, the space being a space in which at least one living body is present; calculating likelihood spectra by use of an estimation algorithm for estimating presence of each of the at least one living body from living body information, using each of different values as a total number of the at least one living body, the likelihood spectra each indicating a likelihood of the presence, the living body information being a living body component included in the complex transfer function; calculating an integrated spectrum by integrating the likelihood spectra calculated in the calculating of the complex transfer function; and estimating, from the integrated spectrum, living body information indicating at least the total number of the at least one living body that is present in the space, and outputting the living body information estimated in the estimating.

This aspect provides an effect analogous to that of the foregoing estimation device.

Also, the recording medium according to an aspect of the present disclosure is a non-transitory computer-readable recording medium having a program recorded thereon for causing a computer to execute the foregoing estimation method.

This aspect provides an effect analogous to that of the foregoing estimation device.

Note that the present disclosure can be implemented not only as a device, but also as an integrated circuit that includes the processing units included in such device, a method that includes as its steps the processing units included in the device, a program that causes a computer to execute these steps, and information, data, or signals that represent such program. Also, such program, information, data, and signals may be distributed in a recording medium such as a CD-ROM, or via a communication medium such as the Internet.

Hereinafter, certain exemplary embodiments are described in greater detail with reference to the accompanying Drawings. Each of the exemplary embodiments described below shows a general or specific example of the present disclosure. The numerical values, shapes, materials, elements, the arrangement and connection of the elements, steps, the processing order of the steps etc. shown in the following exemplary embodiments are mere examples, and therefore do not limit the present disclosure. Therefore, among the elements in the following exemplary embodiments, those not recited in any one of the independent claims are described as optional elements. Also, in the specification and the drawings, elements having substantially the same functional configuration are assigned the same reference marks and are not described to avoid redundancy.

Embodiment 1

With reference to the drawings, the following describes a method and others of estimating the number of persons performed by sensor 1 according to Embodiment 1. Sensor 1 is an example of the estimation device that is capable of estimating information on a living body even when the number of living bodies to be detected is unknown.

[Configuration of Sensor 1]

Figure 2:
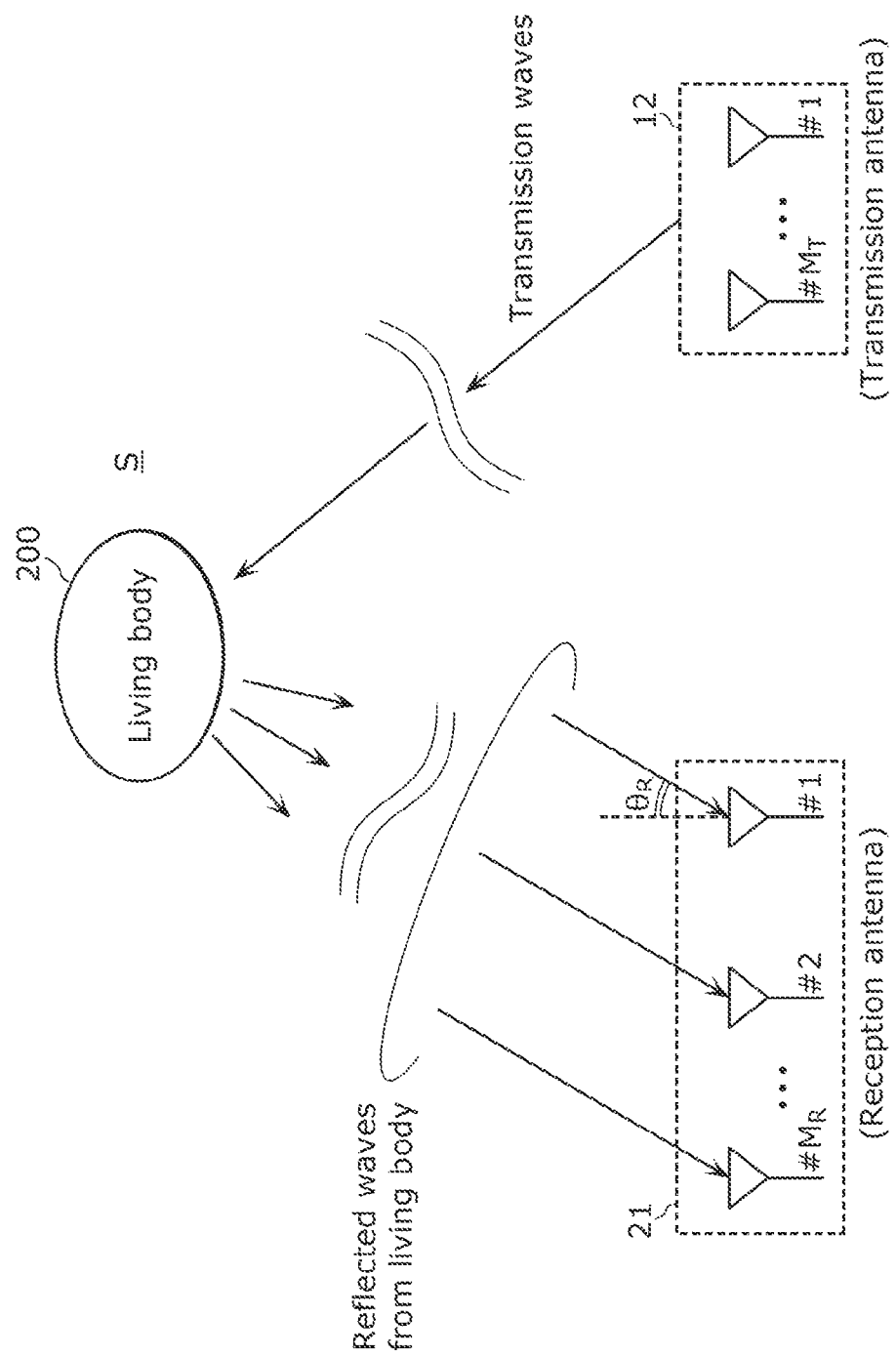
FIG. 2 is a conceptual diagram showing a direction-of-arrival estimation performed by the sensor according to Embodiment 1.

FIG. 1 is a block diagram showing the configuration of sensor 1 according to Embodiment 1. FIG. 2 is a conceptual diagram showing a direction-of-arrival estimation performed by sensor 1 according to Embodiment 1.

Sensor 1 shown in FIG. 1 includes complex transfer function calculator 30, living body component extractor 40, correlation matrix calculator 50, spectrum calculator 70, and estimator 80. Sensor 1 is connected to transmission device 10 and reception device 20. Note that sensor 1 may include either or both of transmission device 10 and reception device 20. Also, transmission device 10 and reception device 20 may be disposed in the same cabinet.

[Transmission Device 10]

Transmission device 10 includes transmitter 11 and transmission antenna 12. Transmission device 10 transmits radio waves in space S. Living body 200 is assumed to be present in space S. The following description is given of an example case where living body 200 is a person (i.e., human body).

Transmission antenna 12 includes an array antenna including MT transmission antenna elements #1 through #MT. Transmission antenna is, for example, a four-element patch array antenna with half-wavelength spacing between elements.

Transmitter 11 generates high-frequency signals. The high-frequency signals generated by transmitter 11 can be used to estimate the presence/absence of living body 200, the position of living body 200, or the number of living bodies. For example, transmitter 11 generates 2.4 GHz continuous waves (CW), and transmits the generated CWs from transmission antenna 12 as radio waves, i.e., transmission waves. Note that the signals to be transmitted are not limited to CWs, and thus may be modulated signals.

[Reception Device 20]

Reception device 20 includes reception antenna 21 and receiver 22. Reception device 20 receives radio waves transmitted from transmission device 10 in space S. The radio waves received can include reflected waves or scattered waves, which are part of the transmission waves transmitted from transmission antenna 12 having been reflected or scattered by living body 200 as signals.

Reception antenna 21 includes an array antenna including MR reception antenna elements #1 through #MR. Reception antenna 21 is, for example, a four-element patch array antenna with half-wavelength spacing between elements. Reception antenna 21 receives the high-frequency signals by the array antenna.

Using a downconverter, for example, receiver 22 converts the high-frequency signals received by reception antenna 21 into signal-processable low-frequency signals. When transmission device 10 transmits modulated signals, receiver 22 also demodulates the received modulated signals. Receiver 22 transfers, to complex transfer function calculator 30, the low-frequency signals obtained by the conversion.

Note that the present embodiment uses 2.4 GHz as an exemplary frequency range, but may use, for example, 5 GHz or millimeter-wave range.

[Complex Transfer Function Calculator 30]

Complex transfer function calculator 30 calculates, from the reception signals received by the array antenna of reception antenna 21, complex transfer functions that represent the propagation characteristics between transmission antenna 12 of transmission device 10 and reception antenna 21. More specifically, complex transfer function calculator 30 calculates, from a low-frequency signal transferred from receiver 22, a complex transfer function representing the propagation characteristics between each of MT transmission antenna elements included in transmission antenna 12 and each of MR reception antenna elements included in reception antenna 21.

Note that complex transfer functions calculated by complex transfer function calculator 30 can include components corresponding to reflected waves or scattered waves, which are part of the transmission waves transmitted from transmission antenna 12 having been reflected or scattered by living body 200 as signals (such components are also referred to as living body components). Also note that complex transfer functions calculated by complex transfer function calculator 30 can also include components corresponding to reflected waves that are transferred without going via living body 200, such as direct waves from transmission antenna 12 and reflected waves from a fixed object. The amplitude and phase of signals reflected or scattered by living body 200, i.e., reflected waves and scattered waves transferred via living body 200, constantly changes due to activities of living body 200 such as breathing and heartbeat.

The following description assumes that complex transfer functions calculated by complex transfer function calculator 30 include living body components corresponding to reflected waves and scattered waves that are signals reflected or scattered by living body 200.

Note that FIG. 1 shows transmission device 10 and reception device 20 that are disposed adjacent to each other, but the disposition of transmission device 10 and reception device 20 is not limited to this. Transmission device 10 and reception device 20 thus may be disposed, for example, spaced apart from each other as shown in FIG. 2. Also note that a single antenna may serve both as the transmission antenna and the reception antenna. Also, the transmission antenna and the reception antenna may be shared use by hardware of a wireless device such as a Wi-Fi router and a slave unit.

[Living Body Component Extractor 40]

Living body component extractor 40 obtains, from complex transfer function calculator 30, signals received by the reception array antenna of reception antenna 21 (such signals are also referred to as reception signals). Living body component extractor 40 then extracts the living body components included in the reception signals, i.e., signal components transmitted from transmission antenna 12 and reflected or scattered by at least one living body 200.

More specifically, living body component extractor 40 records the complex transfer functions calculated by complex transfer function calculator 30 in chronological order, which is the order of signal reception. Living body component extractor 40 then extracts variation components derived from living body 200, from among variations in the complex transfer functions recorded in chronological order. As described above, the variation components included in the complex transfer functions derived from living body 200 correspond to the living body components.

Example methods of extracting living body components include: a method of transforming variations in the complex transfer functions into components in the frequency domain and then extracting frequency components corresponding to living body components; and a method of extracting living body components by calculating a difference between complex transfer functions of two different times. These methods remove the components, included in the complex transfer functions, of direct waves and reflected waves that are transferred via a fixed object. As a result, the living body components transferred via living body 200 remain. Using complex transfer functions equivalent to five seconds, for example, components of a frequency between 0.3 Hz and 3 Hz are extracted as frequency components corresponding to living body components. Through this, it is possible to extract respiratory components derived from living body 200, which are present even when living body 200 stays still.

Note that extraction of 0.3 Hz to 3 Hz components has been described as an example in the present embodiment. To extract components of a slower operation or a faster operation, extraction is simply required to be performed differently to extract frequency components corresponding to the desired operation.

In the present embodiment, the number of transmission antenna elements included in the transmission array antenna is MT, and the number of reception antenna elements included in the reception array antenna is MR. Stated differently, there are a plurality of transmission antenna elements and a plurality of reception antenna elements. As such, complex transfer functions corresponding to the transmission array antenna and the reception array antenna include a plurality of living body components transferred via living body 200.

A plurality of living body components transferred via living body 200 are represented as shown in Expression 1 as a matrix with M rows and N columns (also referred to as living body component channel matrix F(f)).

[Math. 1]

$$F(f) = \begin{pmatrix} F_{11}(f) & \cdots & F_{1N}(f) \\ \vdots & \ddots & \vdots \\ F_{M1}(f) & \cdots & F_{MN}(f) \end{pmatrix} \quad \text{(Expression 1)}$$

Note that each element $F_{ij}$ in the living body component complex transfer function matrix, i.e., living body component channel matrix F(f), is an element obtained by extracting a variation component from each element $h_{ij}$ of complex transfer functions. Also, the living body component complex transfer function matrix, i.e., living body component channel matrix F(f), includes functions of frequencies or difference periods similar to frequencies. Such functions are items of information corresponding to a plurality of frequencies. Note that a difference period is a time difference between two complex transfer functions used in a method of calculating a difference between two complex transfer functions of two different times to extract living body components.

[Correlation Matrix Calculator 50]

Correlation matrix calculator 50 sorts the elements of the living body component channel matrix with M rows and N columns calculated by living body component extractor 40. Through this, correlation matrix calculator 50 converts the living body component channel matrix into living body component channel vector $F_{vec}$ (f) with (M×N) rows and one column. A method of sorting the elements is, for example, as shown in Expression 2, but any operations for sorting matrix elements may be utilized and elements may be sorted into any orders.

[Math. 2]

$$F_{vec}(f) = \text{vec}[F(f)] = [F_{11}(f) \ldots F_{M1}(f) F_{12}(f) \ldots F_{M2}(f) \ldots F_{1N}(f) \ldots F_{MN}(f)]^T \quad \text{(Expression 2)}$$

Subsequently, correlation matrix calculator 50 calculates a correlation matrix from living body component channel vector $F_{vec}$ (f). More specifically, correlation matrix calculator 50 calculates correlation matrix R of living body component channel vector $F_{vec}$ (f) including a plurality of variation components derived from living body 200 in accordance with Expression 3.

[Math. 3]

$$R = E[F_{vec}(f) F_{vec}(f)^H] \quad \text{(Expression 3)}$$

In Expression 3, E[ ] represents an averaging operator and operator H represents complex conjugate transpose. Here, to calculate a correlation matrix, correlation matrix calculator 50 averages living body component channel vector $F_{vec}$ (f) including a plurality of frequency components in the frequency direction. This enables the sensing that simultaneously uses items of information included in the respective frequencies.

[Spectrum Calculator 70]

Spectrum calculator 70 calculates likelihood spectra indicating the likelihood of the presence of living body 200 in space S, and calculates an integrated spectrum, using the calculated likelihood spectra. Spectrum calculator 70 calculates likelihood spectra, using an estimation algorithm for estimating the presence of living bodies in the case where the number of the living bodies that are present in the space has been entered. The likelihood spectra are calculated by, for example, MUSIC method. The following describes an example case of using MUSIC method. Likelihood spectra calculated by MUSIC method are also referred to as MUSIC spectra.

In general, the calculation of likelihood spectra requires the number of incoming waves. To calculate MUSIC spectra by MUSIC method, the number of incoming waves is required. The number of incoming waves corresponds to the number of living bodies 200 that are present in space S in the present embodiment.

Instead of using a single specific value as the number of living bodies, spectrum calculator 70 sequentially uses a plurality of different values as the number of living bodies to calculate MUSIC spectra.

Stated differently, to calculate MUSIC spectra, spectrum calculator 70 uses, as the number of living bodies, variable L by assigning different values to variable L, starting from initial value $L_{start}$ to $L_{end}$. Subsequently, spectrum calculator 70 calculates an integrated MUSIC spectrum by integrating a plurality of MUSIC spectra calculated, using variable L having a plurality of different values. The following describes an operation performed by MUSIC spectrum calculator 70, using expressions.

The result of eigenvalue decomposition of correlation matrix R calculated by correlation matrix calculator 50 is written as:

$$R = U \Lambda U^H, \quad \text{[Math. 4]}$$

where $$U = [u_1, \ldots, u_L, u_{L+1}, \ldots, u_{MR}], \text{ and} \quad \text{[Math. 5]}$$

$$\Lambda = \text{diag}[\lambda_1, \ldots, \lambda_L, \lambda_{L+1}, \ldots, \lambda_{MR}] \quad \text{[Math. 6]}$$

Here, $$u_1, \ldots, u_{MR}: \quad \text{[Math. 7]}$$

is an eigenvector having MR elements.

$$\lambda_1, \ldots, \lambda_{MR} \quad \text{[Math. 8]}$$

are eigenvalues corresponding to the eigenvector.

Assume that $$\lambda_1 \geq \lambda_2 \geq \ldots \geq \lambda_L \geq \lambda_{L+1} \geq \ldots \geq \lambda_{MR} \quad \text{[Math. 9]}$$

is satisfied, where L represents a loop variable used as the number of living bodies, i.e., the number of persons.

Also, a steering vector (directional vector) of the transmission array antenna is defined as:

$$a_T(\theta_T) = [1, e^{-jkd \sin \theta_T}, \ldots, e^{-jkd(M_T-1)\sin \theta_T}], \quad \text{[Math. 10]}$$

and a steering vector (directional vector) of the reception array antenna is defined as:

$$a_R(\theta_R) = [1, e^{-jkd \sin \theta_R}, \ldots, e^{-jkd(M_R-1)\sin \theta_R}], \quad \text{[Math. 11]}$$

Note that when the antenna elements in use have no uniform complex directionality, transmission and reception steering vectors that are created on the basis of complex directionality data obtained by actual measurement may be used. Here, k represents a wavenumber.

Further, a steering vector obtained by multiplying the foregoing steering vectors in consideration of angle information of both the transmission array antenna and the reception array antenna is defined as:

$$a(\theta_T, \theta_R) = \text{vec}[a_T(\theta_T) a_R^T(\theta_R)], \quad [\text{Math. 12}]$$

to which MUSIC method is applied by assigning different values to variable L.

Stated differently, on the basis of MUSIC method, spectrum calculator 70 calculates evaluation function $P_{music}(\theta_T, \theta_R)$ obtained by integrating a plurality of MUSIC spectra represented as Expression 4 below, using the steering vector obtained by the multiplication. This evaluation function is referred to as an integrated MUSIC spectrum, or simply as an integrated spectrum.

[Math. 13]

$$P_{music}(\theta_T, \theta_R) = \frac{1}{\sum_{L=L_{start}}^{L_{end}} \sum_{i=L}^{M \times N} |u_i^H a(\theta_T, \theta_R)|^2} \quad \text{(Expression 4)}$$

Summation is used in Expression 4 as an integration operation, but product may be used instead. Stated differently, in Expression 4, the summation sign below may be replaced by the product sign in Math. 15.

$$\Sigma_{L=L_{start}}^{L_{end}} \quad [\text{Math. 14}]$$

$$\Pi_{L=L_{start}}^{L_{end}} \quad [\text{Math. 15}]$$

Note that predetermined values need to be set as minimum value $L_{start}$ and maximum value $L_{end}$ of variable L. For example, one is set as minimum value $L_{start}$. Alternatively, when the minimum number of living bodies that are present in space S to be measured is already known, such known number is set as minimum value $L_{start}$. Also, when the maximum number of living bodies that are present in space S to be measured is already known, such known number or a value greater by one to three than the known number can be set as maximum value $L_{end}$.

Alternatively, a value that is smaller than the value obtained by multiplying the number of transmission antenna elements by the number of reception antenna elements on the order of one may be set as maximum value $L_{end}$. This is because the maximum number of target objects detectable by MUSIC method is the value that is smaller by one than the value obtained by multiplying the number of transmission antenna elements by the number of reception antenna elements. Also, maximum value $L_{end}$ may be the value of the number of transmission antenna elements or the number of reception antenna elements.

Stated differently, spectrum calculator 70 can calculate likelihood spectra, using, for example, the following natural numbers as variable L: a plurality of natural numbers less than or equal to (the number of transmission antenna elements N×the number of reception antenna elements M−1); a plurality of natural numbers less than or equal to the number of transmission antenna elements N; or a plurality of natural numbers less than or equal to the number of reception antenna elements M. This is because: living body information is more accurately defined when an estimated number of living bodies is less than or equal to the value obtained by multiplying the number of transmission antenna elements by the number of reception antenna elements; and living body information is further more accurately defined when an estimated number of living bodies is less than or equal to the number of transmission antenna elements or the number of reception antenna elements.

Spectrum calculator 70 can also calculate likelihood spectra, using, as variable L, a plurality of natural numbers less than or equal to the value defined as the maximum number of living bodies that can be present in space S.

Spectrum calculator 70 can also calculate likelihood spectra, using, as variable L, a plurality of natural numbers in a range that includes the number of living bodies indicated by living body number information stored in a storage. Here, the storage is a storage device (not illustrated) that stores the living body number information estimated by estimator 80 in the past.

Note that variable L is incremented by one in the foregoing example, but variable L is not required to be incremented by equal amount; variable L may be varied in a variation pattern different from that of incrementing variable L by one. The variation pattern may be preliminary defined, or may be randomly selected in the course of the processing.

Note that MUSIC spectra may be replaced by spectra obtained by Beamformer method or Capon method. It should be noted, however, that Beamformer method or Capon method is inferior to MUSIC method in terms of accuracy, and an individual use of the method cannot achieve a highly accurate estimation. In other words, MUSIC method is superior to Beamformer method or Capon method in that an individual use of MUSIC method achieves a relatively highly accurate estimation.

[Estimator 80]

Estimator 80 estimates, from the integrated spectrum calculated by MUSIC spectrum calculator 70, living body information indicating at least the number of living bodies 200 that are present in space S to be measured, i.e., person information indicating at least the number of persons who are present in space S, and outputs the estimated information. Estimator 80 may also estimate, from the integrated spectrum, living body information further indicating the positions of the living bodies that are present in space S, i.e., person information further indicating the positions of the persons who are present in space S, and output the estimated information.

In ordinary circumstances, MUSIC spectra that are calculated on the basis of a correct number of persons having been entered (i.e., the number of persons who are actually present in space S) exhibit the same number of peaks as the number of persons having been entered. However, the present embodiment integrates a plurality of MUSIC spectra obtained on the basis of various values entered as the number of persons. As such, the resulting integrated spectrum sometimes exhibit virtual images (i.e., peaks that appear in positions in which no person is actually present).

Estimator 80 distinguishes peaks that are not derived from virtual images among the peaks that appear in the integrated spectrum. Estimator 80 then calculates the number of persons on the basis of the peaks that are not derived from virtual images among the foregoing peaks, to estimate person information indicating the number of persons who are present in space S. Estimator 80 may also calculate the positions of the peaks that are not derived from virtual images among the foregoing peaks, to estimate person information further indicating the positions of persons who are present in space S.

Example methods of calculating the number or positions of persons include: a method that uses a ratio approach for the peak values in a spectrum; a method of counting the number of sections (or blocks) in MUSIC spectra in which likelihoods that are greater than or equal to a predetermined threshold continuously appear, i.e., sections in which likelihoods are greater than or equal to the predetermined threshold; and a method that uses machine learning such as a convolutional neural network, using a MUSIC spectrum as images. In the present embodiment, a method that uses a ratio approach to calculate person information will be described as an example method.

Figure 3:
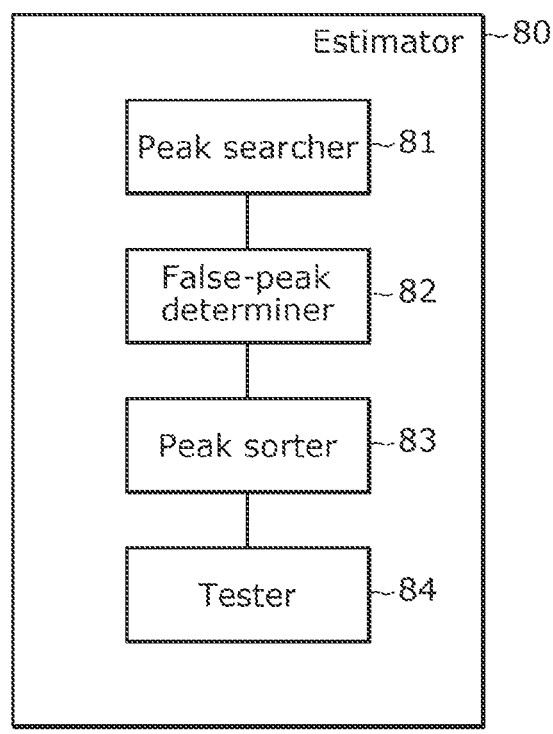
FIG. 3 is a block diagram showing the configuration of an estimator according to Embodiment 1.

FIG. 3 is a detailed block diagram of estimator 80 according to Embodiment 1.

Estimator 80 shown in FIG. 3 includes peak searcher 81, false-peak determiner 82, peak sorter 83, and tester 84.

<Peak Searcher 81>

Peak searcher 81 searches for peaks that take the local maximum value in the integrated spectrum. A group of peaks found by the search is defined as a first peak group. To exclude small peaks derived from noise, peaks of the first peak group may be limited to the peaks each taking the maximum value in a predetermined range x.

Figure 4:
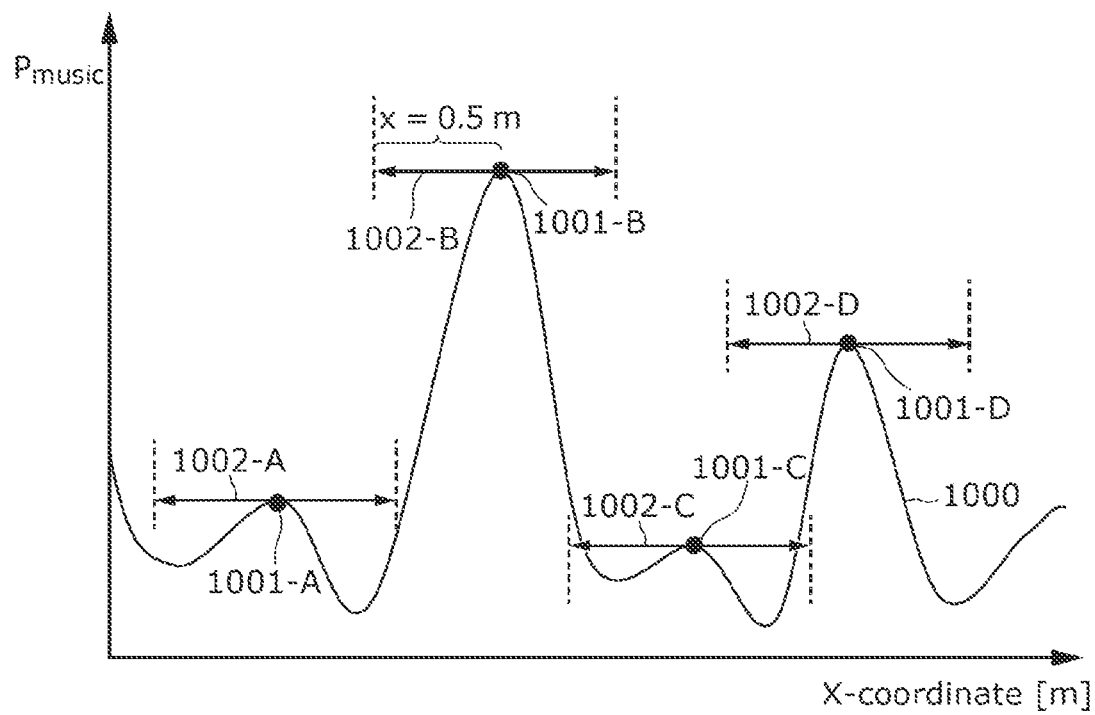
FIG. 4 is a conceptual diagram showing an operation performed by a peak searcher according to Embodiment 1.

FIG. 4 is a conceptual diagram showing an operation performed by peak searcher 81 according to Embodiment 1. With reference to FIG. 4, the process performed by peak searcher 81 is described, using one-dimensional integrated spectrum 1000.

FIG. 4 shows peaks 1001-A, 1001-B, 1001-C, and 1001-D, which are four peaks included in integrated spectrum 1000. Among these four peaks, peaks that take the maximum value within a distance range of 0.5 m or less from the corresponding peaks (i.e., ranges 1002-A, 1002-B, 1002-C, and 1002-D) are three peaks of 1001-A, 1001-B, and 1001-D. Peak searcher 81 extracts the foregoing three peaks from integrated spectrum 1000 and obtains the extracted peaks as the first peak group.

The first peak group corresponds to at least one local maximum value, among a plurality of local maximum values in the likelihood spectra, which is the largest in a predetermined range that includes such local maximum value.

<False-Peak Determiner 82>

False-peak determiner 82 excludes relatively gentle peaks among the peaks included in the first peak group. Virtual images in integrated spectrum 1000 appear as relatively gentle peaks. As such, virtual image-derived peaks are excluded by excluding relatively gentle peaks.

More specifically, false-peak determiner 82 calculates an y % value of the value included in a predetermined distance range x from each of the peak values included in the first peak group. False-peak determiner 82 extracts peaks whose differential from the y % value is greater than or equal to a predetermined threshold z, and obtains the extracted peaks as a second peak group. The differential between the peak value and the y % value may be the difference between the peak value and the y % value (i.e., the peak value–the y % value) or may be the ratio between the peak value and the y % value (i.e., the y % value divided by the peak value). Also, "the value included in a predetermined distance range x" may be any values included in such range, an average of the values included in the range, the maximum value or the minimum value, and so forth.

Through this, false-peak determiner 82 excludes relatively gentle peaks among the peaks included in the first peak group. When the predetermined distance x is 0.5 m, y is 70%, and z is 0.4 dB, for example, false-peak determiner 82 extracts values that are larger by 0.4 dB or greater than the 70% value of the value included within the 0.5 m range from each of the peak values included in the first peak group.

The second peak group, which is the resultant of false-peak determiner 82 excluding the virtual image-derived peaks from the first peak group, corresponds to at least one third local maximum value, whose differential from the value obtained by multiplying a predetermined ratio by the value included in a predetermined range that includes such third local maximum value is greater than or equal to a threshold. Here, the predetermined ratio is a predetermined value that is greater than zero and smaller than one.

<Peak Sorter 83>

Peak sorter 83 sorts the values of a plurality of peaks included in the second peak group in descending order. Note that peak sorter 83 may add, to the second peak group, the value that is smaller by w than the smallest value among the peaks included in the second peak group, as a virtual peak. The virtual peak can be utilized as the second smallest peak after the smallest peak value in comparing each of a plurality of the peaks included in the second peak group with the second smallest peak after such peak value. For example, when w is set to 3.4 dB and the smallest peak is −3 dB with respect to the maximum peak, a virtual peak to be added is −6.4 dB with respect to the maximum peak.

<Tester 84>

Tester 84 calculates a differential between adjacent peak values in the second peak group sorted by peak sorter 83, thereby estimating the number of persons. More specifically, tester 84 calculates a ratio or a difference as the difference between the i-th peak and the i+1-th peak in the second peak group sorted in descending order, and outputs, as the number of persons, "i" that gives the largest difference or ratio. Here, "i" is an integer greater than or equal to one and less than or equal to the number of elements included in the second peak group.

The following describes an example case of using a difference as a differential.

Figure 5:
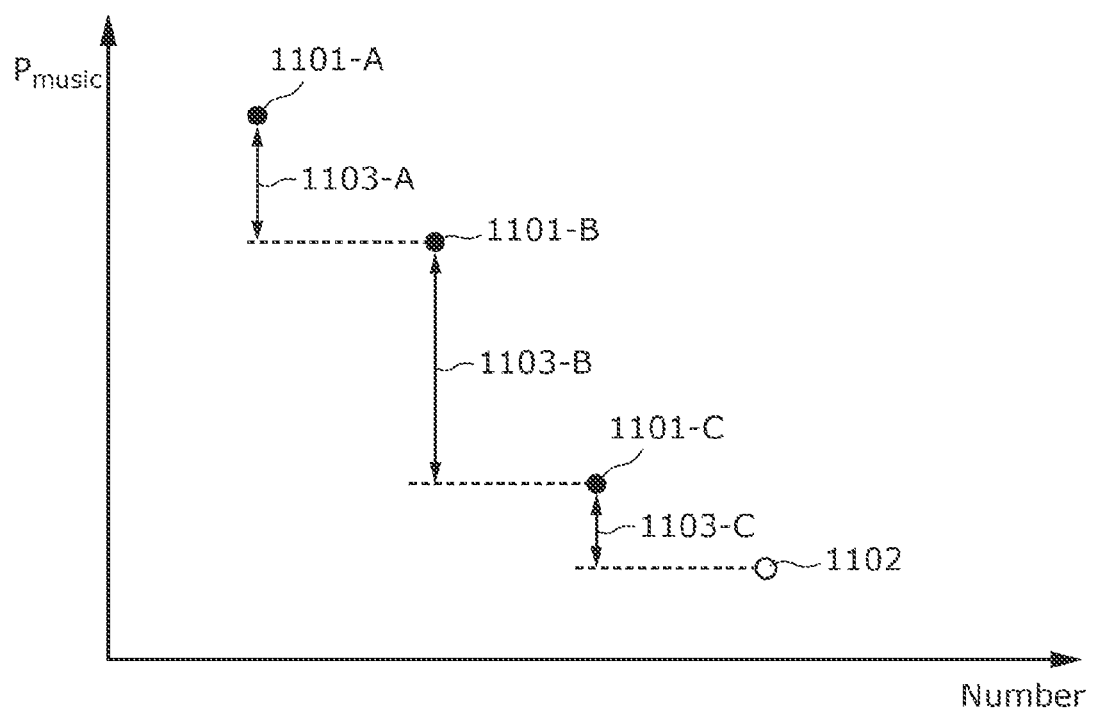
FIG. 5 is a conceptual diagram showing an operation performed by a tester according to Embodiment 1.

FIG. 5 is a conceptual diagram showing an operation performed by tester 84 according to Embodiment 1.

FIG. 5 shows peaks included in the second peak group, 1101-A, 1101-B, 1101-C, and 1102, which are sorted in descending order according to the peak values. Note that peak 1102 is a virtual peak added by peak sorter 83.

Peak sorter 83 calculates differences between adjacent peaks in the second peak group, 1103-A, 1103-B, and 1103-C, to determine a combination of peaks that gives the largest difference by the calculation.

In an example shown in FIG. 5, the largest difference is difference 1103-B, i.e., the difference between the second peak 1101-B and the third peak 1101-C. As such "i" is two, and the number of persons to be calculated is two.

As thus described, tester 84 obtains a first local maximum value, among at least one local maximum value obtained by peak searcher 81, which has the largest differential from a second local maximum value, which is the second largest after such first local maximum value, and obtains the number indicating the place of the obtained first local maximum number in descending order of the at least one local maximum value. Subsequently, estimator 80 estimates and outputs the number obtained by tester 84 as the number of persons who are present in space S.

Note that tester 84 may output the at least one local maximum value per se in the foregoing manner obtained by peak searcher 81 as person information, or may output the person information in the foregoing manner, using, as at least one local maximum value, at least one third local maximum value obtained by false-peak determiner 82 excluding the virtual image-derived peaks from among at least one local maximum value obtained by peak searcher 81.

Note that the foregoing description provides an example case where sensor 1 outputs person information indicating the number of persons, but the positions of persons may be estimated using MUSIC spectra to output person information to output the positions of the persons.

Note that the foregoing embodiment uses, as an exemplary configuration, a multiple-input, multiple-output (MIMO) configuration having a plurality of transmission antennas and a plurality of reception antennas, but a single antenna configuration may be used for one of transmission and reception. In this case, the integrated spectrum outputted by spectrum calculator 70 is a one-directional spectrum, but it is still possible to estimate person information by searching for peaks as in the case where the integrated spectrum is two-dimensional.

Note that a determination may be made on the basis of the magnitude of the maximum eigenvalue, power corresponding to the variation components included in the complex transfer functions, or the degree of correlation between the presence and the absence of persons only for the detection of the absence of persons in space S, i.e., the detection of zero persons, and calculation of likelihood spectra and an integrated spectrum by spectrum calculator 70 may be performed only for the case where any persons are present. This saves the process required to calculate likelihood spectra and an integrated spectrum, when no person is present in space S, thereby contributing to the reduction in power consumption.

[Operation of Sensor 1]

The following describes a process of estimating the number of living bodies performed by sensor 1 with the foregoing configuration.

Figure 6:
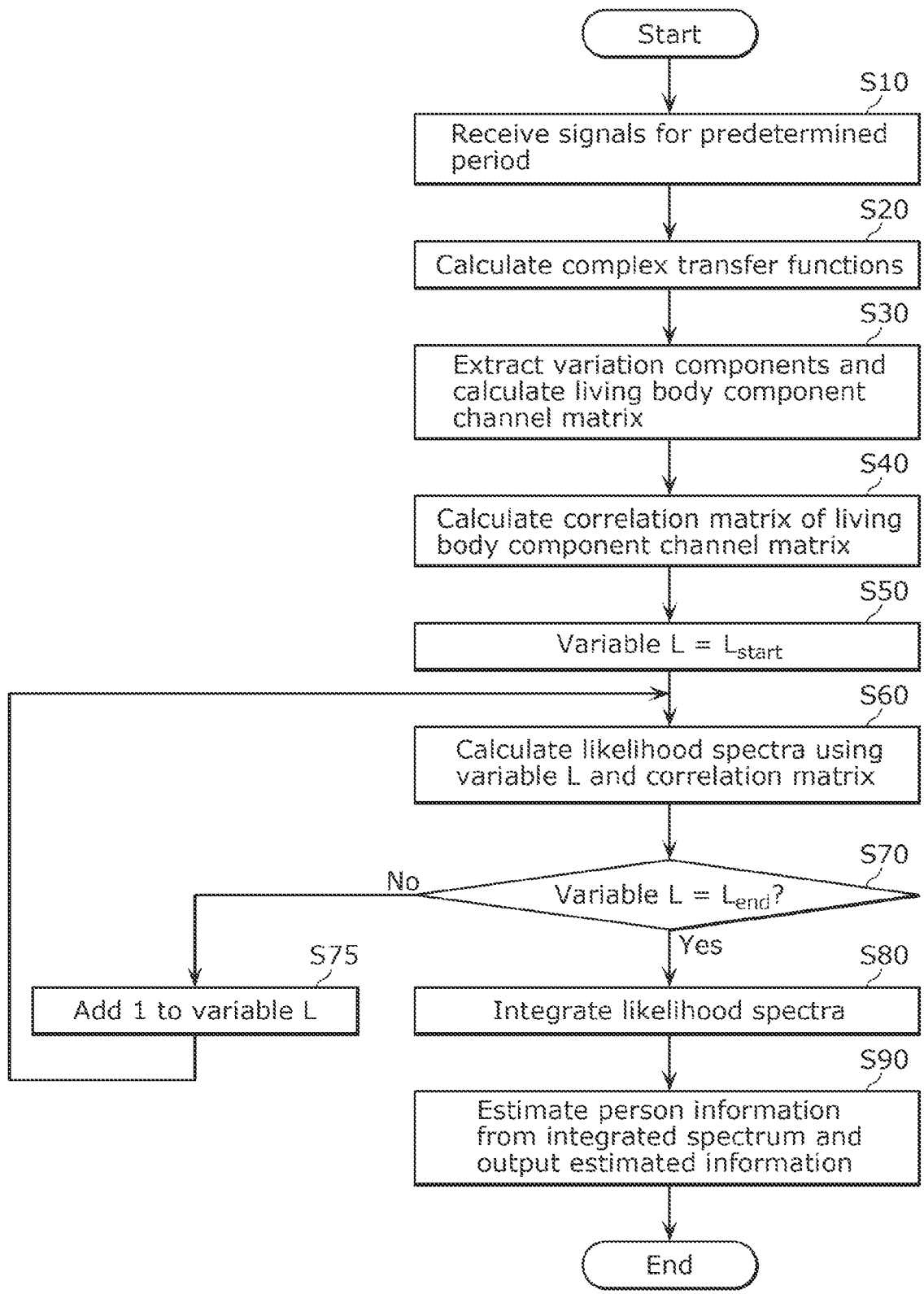
FIG. 6 is a flowchart of a process performed by the sensor according to Embodiment 1.

FIG. 6 is a flowchart of a process performed by sensor 1 according to Embodiment 1.

As shown in FIG. 6, in step S10, sensor 1 receives signals for a predetermined period by reception device 20.

In step S20, sensor 1 calculates complex transfer functions from the reception signals.

In step S30, sensor 1 records the calculated complex transfer functions in chronological order, and calculates a living body component channel matrix by extracting variation components derived from the living body from the complex transfer functions recorded in chronological order.

In step S40, sensor 1 calculates a correlation matrix of the extracted living body component channel matrix.

In step S50, sensor 1 sets initial value $L_{start}$ to variable L.

In step S60, sensor 1 calculates likelihood spectra by MUSIC method, on the basis of variable L set in step S50 or S75 and the correlation matrix calculated in step S40.

In step S70, sensor 1 determines whether variable L matches $L_{end}$. Sensor 1 proceeds to step S80 when determining that variable L matches $L_{end}$ (Yes in step S70), and proceeds to step S75 when determining that variable L does not match $L_{end}$ (No in step S70).

In step S75, sensor 1 adds one to variable L. Subsequently, sensor 1 executes step S60 again.

In step S80, sensor 1 integrates likelihood spectra to calculate an integrated spectrum. The likelihood spectra to be integrated are likelihood spectra calculated by sensor 1 in the processes in steps S50, S60, S70, and S75 by incrementing variable L by one from $L_{start}$ to $L_{end}$.

In step S90, sensor 1 calculates the number of persons from the integrated spectrum calculated in step S80, and estimates and outputs the calculated number of persons as person information. Example methods of performing the process in step S90 include: a method that uses a ratio approach for the peak values in the integrated spectrum; a method of counting the number of blocks that are sections in the integrated spectrum in which values greater than or equal to a predetermined value continuously appear; and a method that uses machine learning such as a convolutional neural network, using the integrated spectrum as images. In the present embodiment, a method that uses a ratio approach to calculate person information will be described as an example method.

Figure 7:
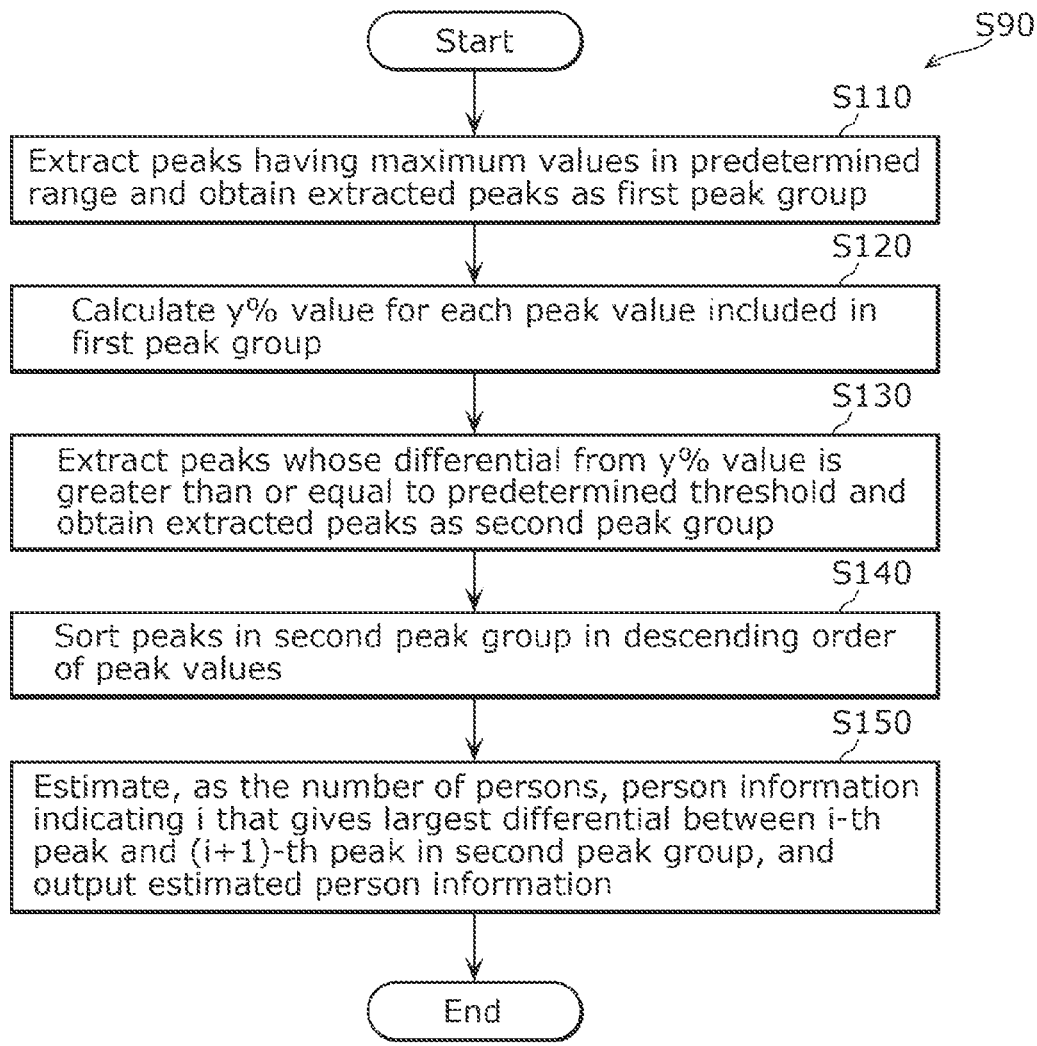
FIG. 7 is a flowchart of a process of calculating person information performed by the sensor according to Embodiment 1.

FIG. 7 is a flowchart of a process of calculating person information performed by sensor 1 according to Embodiment 1. The process shown in FIG. 7 is an exemplary case of performing the process in step S90 by the ratio approach.

As shown in FIG. 7, in step S110, sensor 1 extracts, from the peaks in the integrated spectrum, peaks each taking the maximum value in a predetermined range, and obtains the extracted peaks as the first peak group.

In step S120, sensor 1 calculates the y % value of the value included in a predetermined distance range from each of the peaks included in the first peak group.

In step S130, sensor 1 extracts peaks whose differential from the y % value calculated in step S120 is greater than or equal to a predetermined threshold, from the peaks extracted in step S110, and obtains the extracted peaks as the second peak group.

In step S140, sensor 1 sorts the peaks included in the second peak group in descending order of peak values.

In step S150, sensor 1 calculates a differential between the i-th peak and the (i+1)-th peak in the second peak group, and estimates and outputs, as the number of persons, person information indicating "i" that gives the largest differential. Here, "i" is an integer greater than or equal to one and less than or equal to the number of elements included in the second peak group.

[Effects, Etc.]

Sensor 1 according to the present embodiment is capable of estimating, with high accuracy, the number of living bodies 200 that are present in space 5, using wireless signals.

Some of the existing estimation methods of deriving likelihood spectra used to estimate the number of living bodies 200 that are present in space S require an entry of the number of living bodies in space S.

Sensor 1 according to the present embodiment estimates the number of living bodies that are present in space S, using an integrated spectrum obtained by integrating likelihood spectra that are calculated by use of a plurality of values as the number of living bodies that are present in space S. With this, it is possible to estimate living body information indicating the number of living bodies that are present in space S even when the number of living bodies in space S is unknown.

Embodiment 2

In Embodiment 1, a method is described of using a ratio approach to estimate living body information (i.e., person information) from an integrated spectrum. In Embodiment 2, a method will be described of using a method of estimating living body information by counting the number of blocks that are sections in the integrated spectrum in which likelihoods are greater than or equal to a predetermined threshold.

The sensor according to the present embodiment has the same configuration as that of sensor 1 according to Embodiment 1, but is different in that estimator 80 included in sensor 1 according to Embodiment 1 is replaced by estimator 2080. The configuration of the present embodiment other than estimator 2080 is the same as that of Embodiment 1, and thus will not be described here.

Figure 8:
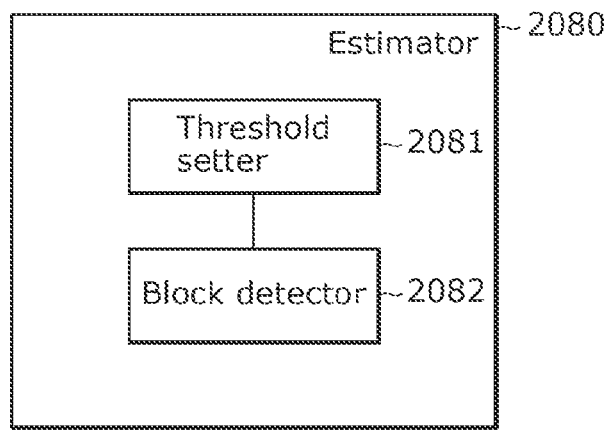
FIG. 8 is a block diagram showing the configuration of an estimator according to Embodiment 2.
Figure 9:
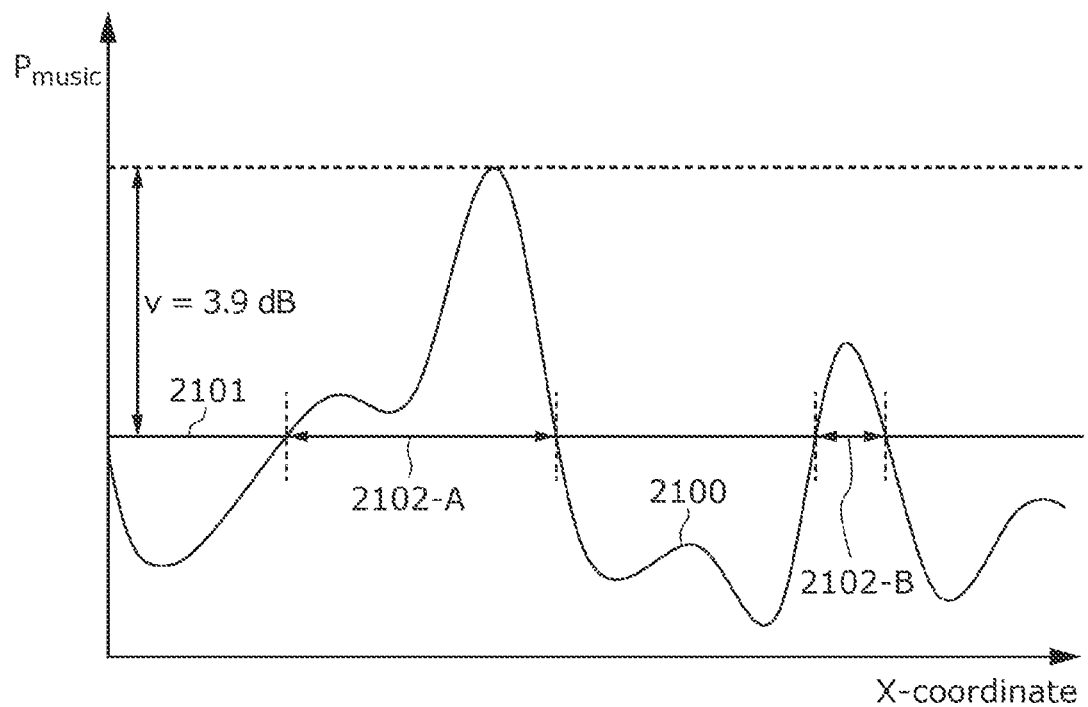
FIG. 9 is a conceptual diagram showing an operation performed by a block detector according to Embodiment 2.

FIG. 8 is a block diagram showing the configuration of estimator 2080 according to Embodiment 2. FIG. 9 is a conceptual diagram showing an operation performed by block detector 2082 according to Embodiment 2. Integrated spectrum 2100 shown in FIG. 9 is an example of the integrated spectrum calculated by spectrum calculator 70.

As shown in FIG. 8, estimator 2080 includes threshold setter 2081 and block detector 2082.

Threshold setter 2081 sets threshold 2101 that is smaller by v[dB] than the maximum value in integrated spectrum 2100. Note that the values of v and threshold 2101 may be preliminary set fixed values, or may be the values obtained by evaluating the accuracy of estimating the number of persons by assigning different values to v and threshold 2101 beforehand to use threshed 2101 that achieves the highest accuracy as the optimum value. In the case where sensing is performed in a 4 m-square room by a four-element patch array antenna with half-wavelength spacing between elements using unmodulated continuous waves of 2.47125 GHz, for example, v can be set to 3.9 dB.

Block detector 2082 detects, as blocks, sections in which likelihoods in integrated spectrum 2100 are greater than or equal to threshold 2101, and obtains the number of the detected blocks.

Estimator 2080 estimates, as the number of persons who are present in space S, the number of blocks obtained by block detector 2082.

In an example shown in FIG. 9, two blocks, that is, blocks 2012-A and 2102-B, are detected as sections in which values in integrated spectrum 2100 are greater than or equal to threshold 2101. Block detector 2082 calculates person information indicating that the number of persons is two.

[Effect, Etc.]

The sensor according to Embodiment 2 reduces the amount of computation performed by estimator 2080 compared to sensor 1 according to Embodiment 1. This lowers the capability standard for a processing device that is required for real-time processing, thus enabling low-cost estimation of person-related information.

Embodiment 3

In Embodiment 1, a method is described of using a ratio approach to estimate living body information (i.e., person information) from an integrated spectrum. In Embodiment 3, a method will be described of using a machine learning model (e.g., a convolutional neural network) to estimate living body information from the integrated spectrum.

The sensor according to the present embodiment has the same configuration as that of sensor 1 according Embodiment 1, but different in that estimator 80 included in sensor 1 according to Embodiment 1 is replaced by estimator 3080. The configuration of the present embodiment other than estimator 3080 is the same as that of Embodiment 1, and thus will not be described here.

Figure 10:
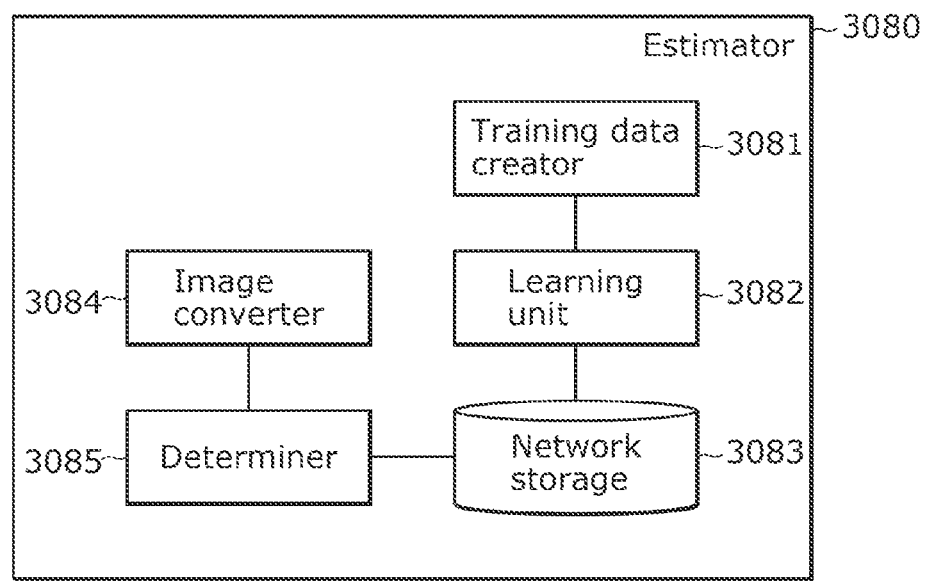
FIG. 10 is a block diagram showing the configuration of an estimator according to Embodiment 3.

FIG. 10 is a block diagram showing the configuration of estimator 3080 according to Embodiment 3.

As shown in FIG. 10, estimator 3080 includes training data creator 3081, learning unit 3082, network storage 3083, image converter 3084, and determiner 3085.

Training data creator 3081, learning unit 3082, and network storage 3083 preliminary learn a machine learning model. Image converter 3084 and determiner 3085 calculate person information for test data, using the preliminary learned machine learning model.

Training data creator 3081 obtains a plurality of images representing MUSIC spectra in the case where the number of persons is known beforehand, and stores the obtained images as training data images. Here, the training data images include images representing a plurality of MUSIC spectra of the persons assumed to be present in space S. When the upper limit of the number of persons in space S to be measured is three, for example, the training data images include a plurality of training data images (e.g., 100 or more) for each of zero persons, one person, two persons, and three persons.

Learning unit 3082 learns the machine learning model, using the training data images as inputs. The machine learning model is, for example, a convolutional neural network model. The training data images used as inputs are the training data images stored by training data creator 3081. Note that a method such as transfer learning may be used here to improve the efficiency of neural network learning.

Network storage 3083 stores the convolutional neural network created by the learning performed by learning unit 3082 in, for example, a memory in a computer, a recording medium such as a CD-ROM, or a server located outside of the sensor. To store the convolutional neural network in a server located outside of the sensor, data of the convolutional neural network is sent to such server by communication over a network.

Image converter 3084 converts the integrated spectrum calculated by spectrum calculator 70 into a format that is processable by the convolutional neural network to generate input data. An image in the format processable by the convolutional neural network is, for example, a heatmap image, the elements of which correspond to the values of the integrated spectrum.

Determiner 3085 obtains person information that is outputted by inputting the input data generated by image converter 3084 to the convolutional neural network stored in network storage 3083.

Estimator 3080 estimates the person information obtained by determiner 3085 as person information indicating the number of persons who are present in space S.

The sensor according to an aspect of the present disclosure has been described above on the basis of the embodiments, but the present disclosure is not limited to these embodiments. The present disclosure also includes a variation achieved by making various modifications to the embodiments that can be conceived by those skilled in the art without departing from the essence of the present disclosure and an embodiment achieved by combining elements included in different embodiments.

Note that the present disclosure can be implemented not only as a sensor that includes such characteristic elements, but also as an estimation method, etc. that includes as its steps the characteristic elements included in the sensor and as a computer program that causes a computer to execute these characteristic steps included in the method. Such computer program can be distributed in a non-transitory computer-readable recording medium such as a CD-ROM, or via a communication network such as the Internet.

[Effect, Etc.]

The use of machine learning by a convolutional neural network by the sensor according to Embodiment 3 enables automatic adjustment of various parameters such as thresholds that need to be changed depending on the environment in which the sensor is located. The present embodiment is also expected to improve the accuracy of estimating the number of persons by updating the trained network whenever necessary.

INDUSTRIAL APPLICABILITY

The present disclosure is applicable for use in a measurement device that measures the number and positions of living bodies, a home appliance that performs control in accordance with the number and positions of living bodies, a surveillance device that detects the intrusion of a living body, and so forth.

REFERENCE SIGNS LIST 1 sensor
10 transmission device
11 transmitter
12 transmission antenna
20 reception device
21 reception antenna
22 receiver
30 complex transfer function calculator
40 living body component extractor
50 correlation matrix calculator
70 spectrum calculator
80, 2080, 3080 estimator
81 peak searcher
82 false-peak determiner
83 peak sorter
84 tester
200 living body
1000, 2100 integrated spectrum
1001-A, 1001-B, 1001-C, 1001-D, 1101-A, 1101-B, 1101-C, 1102 peak
1002-A, 1002-B, 1002-C, 1002-D range
1103-A, 1103-B, 1103-C difference
2081 threshold setter
2082 block detector
2101 threshold
2102-A, 2102-B block
3081 training data creator
3082 learning unit
3083 network storage
3084 image converter
3085 determiner
S space

The invention claimed is:

1. An estimation device, comprising:
a complex transfer function calculator that calculates a complex transfer function representing propagation characteristics between each of N transmission antenna elements and each of M reception antenna elements, using radio waves that are transmitted in a space as a reception signal from each of the N transmission antenna elements and received by each of the M reception antenna elements, where N and M are natural numbers greater than or equal to two, the space being a space in which at least one living body is present;
a spectrum calculator that:
(a) calculates likelihood spectra by use of an estimation algorithm for estimating presence of each of the at least one living body from living body information, using a total number of the at least one living body as a variable, the variable being changed when calculating the likelihood spectra, the likelihood spectra each indicating a likelihood of the presence, the living body information being a living body component included in the complex transfer function; and
(b) calculates an integrated spectrum by integrating the likelihood spectra calculated by changing the variable; and
an estimator that estimates, from the integrated spectrum, living body information indicating at least the total number of the at least one living body that is present in the space, and outputs the living body information estimated.

2. The estimation device according to claim 1, wherein the estimator estimates, from the integrated spectrum, the living body information further indicating a position of each of the at least one living body that is present in the space, and outputs the living body information estimated.

3. The estimation device according to claim 1, wherein the variable is less than or equal to (N×M−1), less than or equal to N, or less than or equal to M.

4. The estimation device according to claim 1, wherein the variable is less than or equal to a value that is defined as a maximum number of living bodies that can be present in the space.

5. The estimation device according to claim 1, further comprising:
a storage that stores the living body information estimated by the estimator in the past,
wherein the variable is in a range that includes a total number of living bodies indicated by the living body information stored in the storage.

6. The estimation device according to claim 1, wherein the estimator:
obtains at least three local maximum values among a plurality of local maximum values in the likelihood spectra, each of which takes a maximum value in a predetermined range that includes a corresponding one of the at least three local maximum values;
determines a first local maximum value that is one of the at least three local maximum values obtained and whose differential from a second local maximum value is largest, the second local maximum value being second largest after the first local maximum value; and
estimates, as the total number of the at least one living body, a number indicating a place of the first local maximum value determined in descending order of the at least three local maximum values.

7. The estimation device according to claim 6, wherein the estimator determines the first local maximum value, using, as the at least three local maximum values, only at least one third local maximum value that is one of the at least three local maximum values and whose differential from a value is greater than or equal to a threshold, the value being obtained by multiplying, by a predetermined ratio, a value included in a predetermined range that includes the at least one third local maximum value.

8. The estimation device according to claim 1, wherein the estimator estimates, as the total number of the at least one living body, a total number of sections in which the likelihood in each of the likelihood spectra is greater than or equal to a threshold, the sections being sections of the likelihood spectra.

9. The estimation device according to claim 1, wherein the estimator estimates, as the total number of the at least one living body, a total number of living bodies that is outputted by inputting the integrated spectrum calculated by the spectrum calculator to a model that is preliminarily created by machine learning that uses, as training data, the total number of the at least one living body and an image representing each of the likelihood spectra that indicates the likelihood of the presence of each of the at least one living body in the space.

10. The estimation device according to claim 9, wherein the estimator outputs the living body information, using, as the model, a convolutional neural network model.

11. The estimation device according to claim 1, wherein the spectrum calculator calculates the likelihood spectra, using, as the estimation algorithm, an estimation algorithm for estimating presence of each living body indicated by a total number of living bodies that are present in the space, when the total number of living bodies has been entered to the estimation algorithm.

12. The estimation device according to claim 1, wherein the spectrum calculator calculates the likelihood spectra, using, as the estimation algorithm, MUltiple SIgnal Classification (MUSIC) method.

13. An estimation method, comprising:

calculating a complex transfer function representing propagation characteristics between each of N transmission antenna elements and each of M reception antenna elements, by use of radio waves that are transmitted in a space as a reception signal from each of the N transmission antenna elements and received by each of the M reception antenna elements, where N and M are natural numbers greater than or equal to two, the space being a space in which at least one living body is present;

calculating likelihood spectra by use of an estimation algorithm for estimating presence of each of the at least one living body from living body information, using a total number of the at least one living body as a variable, the variable being changed when calculating the likelihood spectra, the likelihood spectra each indicating a likelihood of the presence, the living body information being a living body component included in the complex transfer function;

calculating an integrated spectrum by integrating the likelihood spectra calculated in the calculating of the complex transfer function by changing the variable; and estimating, from the integrated spectrum, living body information indicating at least the total number of the at least one living body that is present in the space, and outputting the living body information estimated in the estimating.

14. A non-transitory computer-readable recording medium having a program recorded thereon for causing a computer to execute the estimation method according to claim 13.

* * * * *